United States Patent [19]
Isawa

[11] Patent Number: 5,112,130
[45] Date of Patent: May 12, 1992

[54] APPARATUS AND METHOD FOR MEASURING RELATIVE DISPLACEMENT OF OBJECTS

[75] Inventor: Nobuo Isawa, Tokyo, Japan

[73] Assignee: Kabushiki Kaisha Topcon, Tokyo, Japan

[21] Appl. No.: 422,114

[22] Filed: Oct. 16, 1989

[30] Foreign Application Priority Data

Oct. 18, 1988 [JP] Japan .................. 63-262401

[51] Int. Cl.$^5$ .................. G01B 11/14; G01D 9/00
[52] U.S. Cl. .................. 356/373; 356/375; 346/33 C
[58] Field of Search .................. 356/373, 375, 5; 346/33 C, 33 A; 33/1 HH

[56] References Cited

U.S. PATENT DOCUMENTS 3,180,205 4/1965 Hepp et al. .................. 356/375
4,576,481 3/1986 Hansen .................. 356/373

Primary Examiner—F. L. Evans
Assistant Examiner—K. P. Hantis
Attorney, Agent, or Firm—Brumbaugh, Graves, Donohue & Raymond

[57] ABSTRACT

The present invention relates to a separation measuring method and a separation measuring apparatus for measuring the separation of objects, which have been displaced relatively, by using optical distance measuring equipments, and more particularly to a separation measuring method and a separation measuring apparatus most suitable for the detection of the activity of a fault to predict an earthquake. In the present measuring method, two optical distance measuring equipments are arranged near the separation plane, and carry out measurement simultaneously to measure a first distance and a second distance, and the difference between the first distance and the second distance is calculated to find the separation of the first and second objects, so that the separation can be measured by simultaneous observations. Since the present invention can find the separation by simultaneous measurements and therefore will not undergo the influence of meterological conditions such as atmospheric pressure, temperature, etc. The present measuring apparatus is provided with a measurement start signal forming means and an arithmetic section, and can operate two optical distance measuring equipments simultaneously to calculate at a high speed the difference of the measured values of the optical distance measuring equipments. Thus, an observation environment can be provided wherein variation of the earth's crust can simultaneously be observed independent of observation condition factors such as temperature, atmospheric pressure, etc.

7 Claims, 4 Drawing Sheets

APPARATUS AND METHOD FOR MEASURING RELATIVE DISPLACEMENT OF OBJECTS

BACKGROUND OF THE INVENTION

The present invention relates to a separation measuring method and a separation measuring apparatus for measuring the separation of objects, which have been displaced relatively, by using optical distance measuring equipments, and more particularly to a separation measuring method and a separation measuring apparatus most suitable for predicting an earthquake by detecting the activity of a fault.

It is said that when the base rock under the ground has been deformed by undergoing an enormous force, for example, of a plate, and a fissure has been formed in the base rock, an earthquake occurs. Therefore, in order to predict an earthquake, it is required to observe strain in the earth crust (that can be determined from the relative movement of the regions on the opposite sides of the active fault and the interval therebetween) at time intervals. Thus, the observation of diastrophism is performed by using, for example, a laser extensometer or an optical distance measuring equipment that can measure distance precisely. In general, a method is used wherein a reference point that serves as a reference of the measurement is set, several observation points that are apart from the reference point are set in regions on the opposite sides of the active fault, these base line net works are observed at time intervals, and accumulated side length changes in the side lengths that are equivalent to the intervals between the reference point and the measurement points are observed.

However, in the above prior observation of diastrophism, distances are measured at time intervals at observation points whose distances from the reference point are known, and changes in the measurements are observed, which is an absolute amount observation. Therefore, to measure the variations of diastrophism, at least two measurements are required, but at each measurement, observation conditions such as temperature, atmospheric pressure, etc. are different inevitably, and therefore there is a problem that the variations of diastrophism cannot be calculated accurately. Thus, the advent of an observation environment has been desired eagerly that allows variations of diastrophism to be simultaneously observed independent of observation condition factors such as temperature, atmospheric pressure, etc.

DETAILED DESCRIPTION OF THE INVENTION Principle of the Invention

Figure 6:
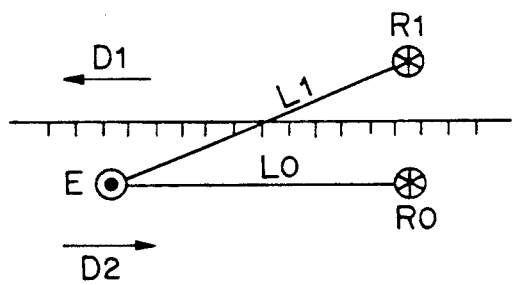
FIGS. 6, 7, and 8 are diagrams that illustrate the principle of the present invention.

The present separation measuring method will be described with reference to FIGS. 6 to 8. It is assumed that, for example, a fault is displaced to the left by $D_1$ and to the right by $D_2$ as shown in FIG. 6. Then, the difference between the measurement member $L_1$ extending through the fault and the measurement member $L_0$ on the same plate can be used to find the lateral separation.

Figure 7:
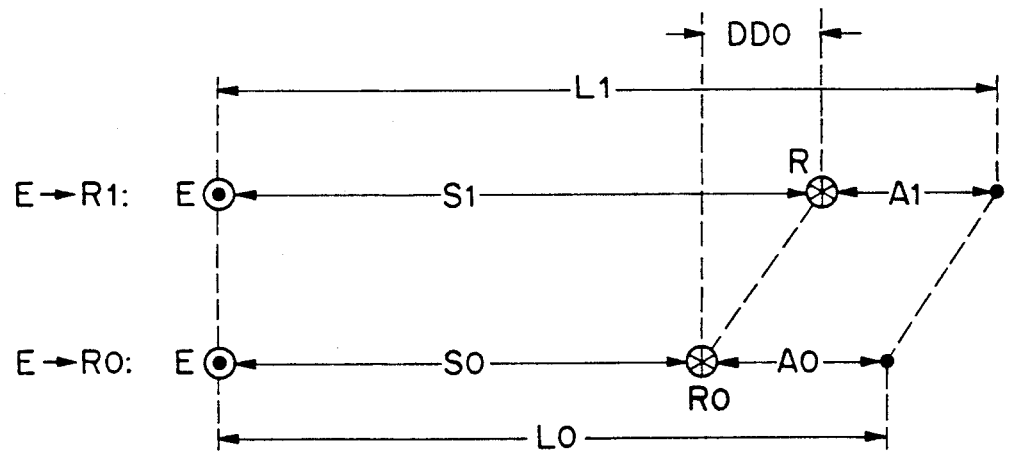

(a) When the fault is stable:

Herein the distance from E to $R_1$ is designated as $S_1$, the distance from E to $R_0$ is designated as $S_0$, and assuming $A_1$ and $A_0$ as meteorological corrections due to the influence by temperature, atmospheric pressure, etc., the measurement lengths $L_1$ and $L_0$ are, as shown in FIG. 7, $$L_1 \text{ (measurement length)} = S_1 \text{ (distance from E to } R_1) - A_1 \tag{1}$$

$$L_0 \text{ (measurement length)} = S_0 \text{ (distance from E to } R_0) + A_0 \tag{2}$$

Herein, if the meteorological conditions such as temperature, atmospheric pressure, etc. for the optical paths of both members are assumed the same, since $$A_1 \approx A_0.$$

the difference ($DD_0$) between the measurement lengths $L_1$ and $L_0$ is given by $$DD_0 = S_1 - S_0 \ldots \tag{3}$$

To find the variation, the initial value of $DD_0$ is suitably predetermined, and the difference from the initial value is found for every measurement and calculation.

Figure 8:
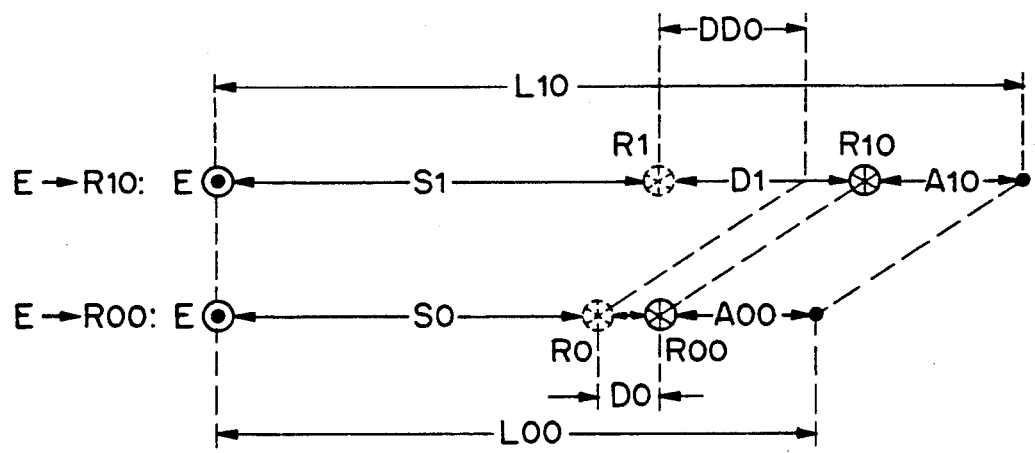

(b) When the fault has changed:

If it is assumed that the fault has changed by $D_1$ and $D_0$ as shown in FIG. 8, supposing the meteorological conditions such as temperature, atmospheric pressure, etc. for the optical paths of both members being the same, $$A_{10} \approx A_{00}.$$

and the difference between the measurement lengths $L_{10}$ and $L_{00}$ is given by $$L_{10} - L_{00} = S_1 - S_0 - D_1 - D_0 \ldots \tag{4}$$

From (4)−(3), the variation $DD_0$ is given by $$DD_0 = D_1 - D_0 \tag{5}$$

EXAMPLES

Figure 5:
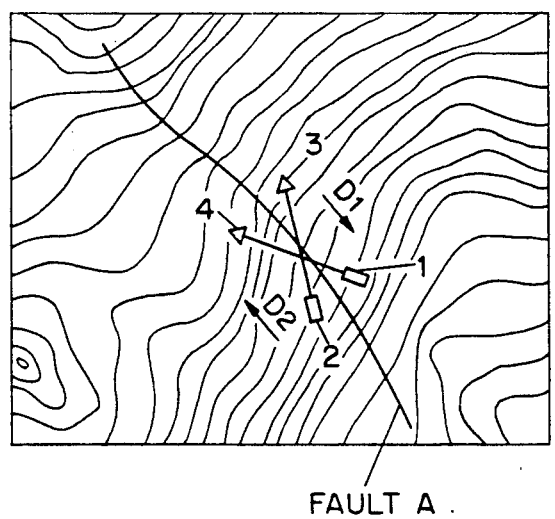
FIG. 5 is a diagram that illustrates how to use the apparatus.

Examples of the present invention will now be described with reference to the drawings. FIG. 5 is a map showing an active indicated at a solid line A. Let's consider that the fault is separated in the directions shown by arrows in the map. The movements are designated as $D_1$ and $D_2$. Herein it is supposed that the movements of the fault are measured by using two optical distance measuring equipments. Further, referring to an optical distance measuring equipment it is described in U.S. Pat. No. 4,413,904, 4,531,833 and U.S. Pat. No. 4,560,271.

FIRST EXAMPLE

Figure 1:
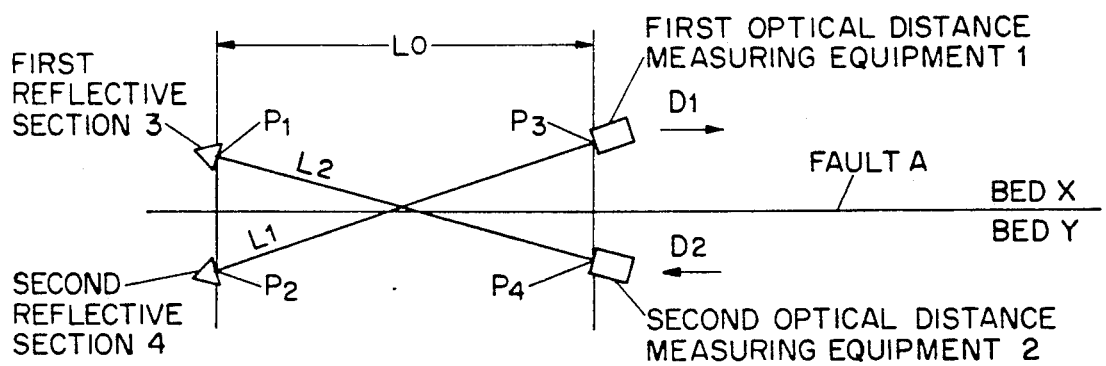
FIGS. 1 and 2 are diagrams that illustrate two examples of the measuring method of the invention.

A first separation measuring method will be described with reference to FIG. 1. It is assumed that a bed X and a bed Y on the opposite sides of a fault A have been displaced relatively. The movement of the bed X is designated as $D_1$, and the movement of the bed Y is designated as $D_2$. The arrows indicate the directions of the movements. A first optical distance measuring equipment 1 and a first reflective section 3 are placed in the bed X, and a second optical distance measuring equipment 2 and a second reflective section 4 are placed in the bed Y. For the first and second reflective sections 3 and 4, use is made of corner cubes used generally for an optical distance measuring equipment. The light projected from the first optical distance measuring equipment 1 is reflected by the second reflective section 4, and the first optical distance measuring equipment 1 and the second reflective section 4 are placed in positions where the distance $L_1$ can be measured. That is, the first optical distance measuring equipment 1 is placed at a point 3 ($P_3$), and the second reflective section 4 is placed at a point 2 ($P_2$). The light projected from the second optical distance measuring equipment 2 is reflected by the first reflective section 3, and the second optical distance measuring equipment 2 and the first reflective section 3 are placed in positions where the distance $L_2$ can be measured. That is, the second optical distance measuring equipment 2 is placed at a point 4 ($P_4$), and the first reflective section 3 is placed at a point 1 ($P_1$). Herein, if it is supposed that the right direction is positive direction and the linear distance between the first and second optical distance measuring equipments 1 and 2 and the first and second reflective sections 3 and 4 is $L_0$, then $$L_1 - L_2 = (L_0 - D_1 - D_2) - (L_0 - D_1 - D_2) = 2(D_1 + D_2) \quad (6)$$

and therefore the movement ($D_1 + D_2$) of the fault A can be obtained. It is desirable to place the first and second optical distance measuring equipments 1 and 2 and the first and second reflective sections 3 and 4 in such a manner that the distance of $L_1$ and the distance $L_2$ may be equal to each other as far as possible, thereby preventing a measurement error from occurring.

SECOND EXAMPLE

Figure 2:
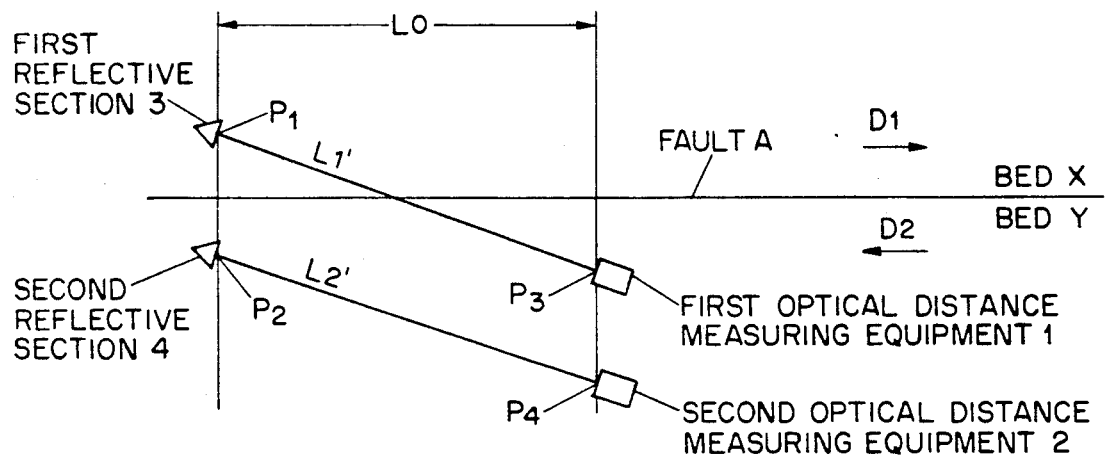

A second separation measuring method will now be described with reference to FIG. 2. Similarly to the first example, it is assumed that a bed X and a bed Y are displaced relatively. First, a first reflective section 3 is placed in the bed X, first and second optical distance measuring equipments 1 and 2 and a second reflective section 4 are placed in the bed Y. The light projected from the first optical distance measuring equipment 1 is reflected by the first reflective section 3, and the first optical distance measuring equipment 1 and the first reflective section 3 are placed in positions where the distance $L'_1$ can be measured. That is, the first optical distance measuring equipment is placed at a point 3 ($P_3$), and the first reflective section 3 is placed at a point 1 ($P_1$). Further, the light projected from the second optical distance measuring equipment 2 is reflected by the second reflective section 4, and the second optical distance measuring equipment 2 and the second reflective equipment 4 are placed in positions where the distance $L'_2$ can be measured. That is, the second optical distance measuring equipment 2 is placed at a point 4 ($P_4$), and the second reflective section 4 is placed at a point 2 ($P_2$) $L'_1 - L'_2$ is determined similarly to the first example:

$$L'_1 - L'_2 = (L_0 - D_2 - D_1) - (L_0) = -D_1 - D_2 = -(D_1 + D_2) \quad (7)$$

Thereby, the movement ($D_1 + D_2$) of the fault A can be found.

Figure 3:
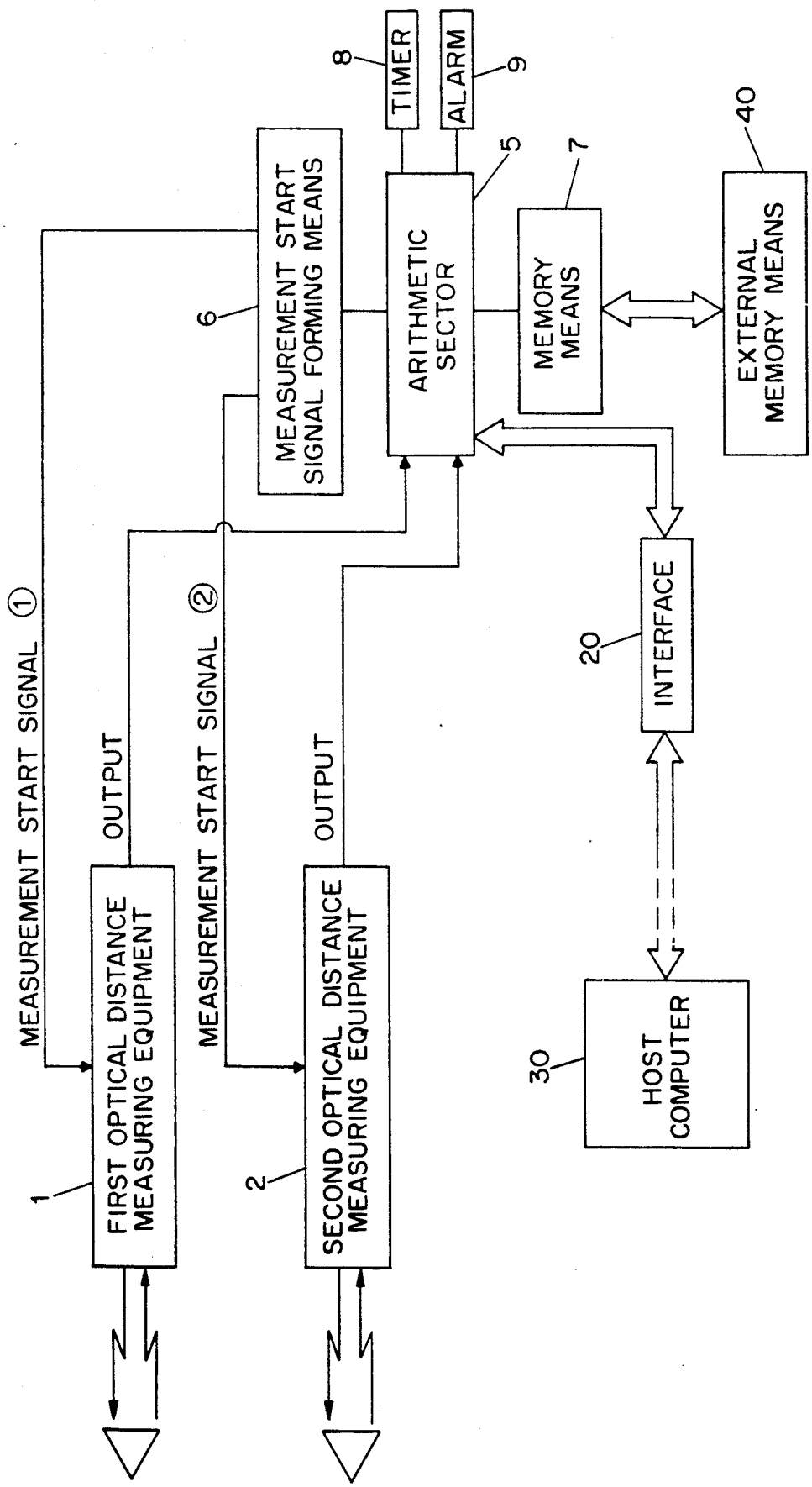
FIG. 3 is a diagram showing the constitution of the measuring apparatus of the invention.
Figure 4:
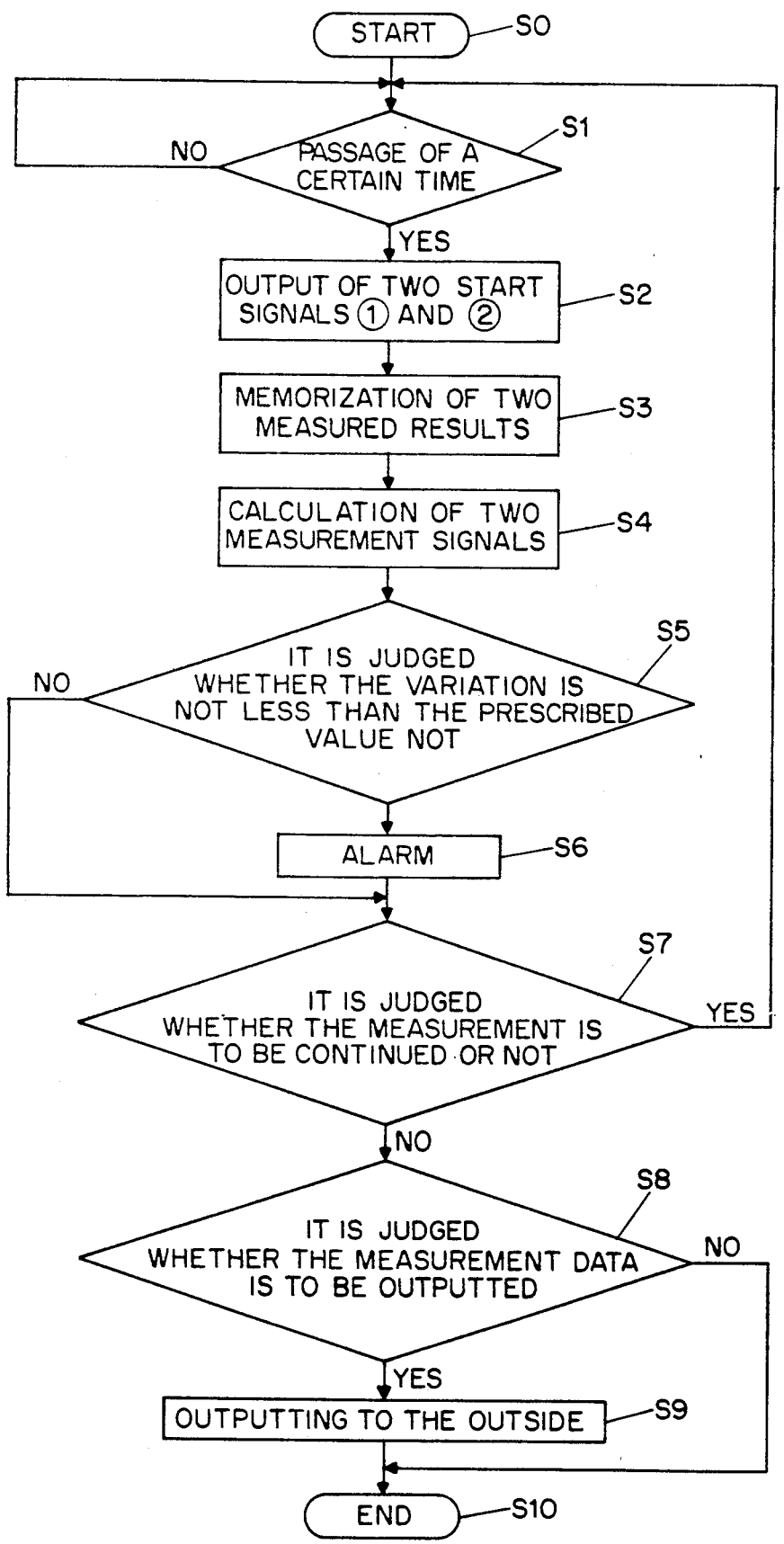
FIG. 4 is a diagram that illustrates the operation of the measuring apparatus.

The separation measuring apparatus used in the separation measuring methods of the examples will be described with reference to FIGS. 3 and 4.

The separation measuring apparatus of this example is a continuous measuring apparatus for measuring the change in diastrophism, and consists of a first optical distance measuring equipment 1, a second optical distance measuring equipment 2, a first reflective section 3, a second reflective section 4, an arithmetic section 5, a measurement start signal forming means 6, a memory means 7, a timer 8, an alarm 9, and an interface 20. The first and second optical distance measuring equipments 1 and 2 are apparatuses for measuring the time required for reflection of light to determine the distance, and can measure a distance accurately. The first and second reflective sections 3 and 4 are corner cubes for reflecting the light projected from the first and second optical distance measuring equipments 1 and 2, and the combinations of the corner cubes and the optical distance measuring equipments allow the intervals between them to be measured. The arithmetic section 5 calculates the moved distance of the fault A from the measured data of the first and second optical distance measuring equipments 1 and 2, and also controls the measurement start signal forming means 6, the memory means 7, etc. The measurement start signal forming means 6 generates a control signal for starting the measurement by the first and second optical distance measuring equipments 1 and 2. The memory means 7 memorizes the measured results of the first and second optical distance measuring equipments 1 and 2, the calculated results of the arithmetic section 5, the data of the timer 8, etc. The timer 8 generates time data at the time of continuous observation when observation is effected at certain time intervals. The alarm 9 generates an alarm sound. The interface 20 is for the connection to communication circuits, and allows data communication through RS-232C or the like.

Now, the operation of this example will be described with reference to FIG. 4. First, in a step 0 (hereinafter referred to as S0), the power source (not shown) of the continuous observation apparatus is turned on to start the observation. Then, in S1, based on the time data from the timer 8, the arithmetic section 5 judges whether the set time has passed or not. If the set time has passed, S2 is carried out, while if the set time has not passed, S1, is repeated. In S2, based on the control signal from the arithmetic section 5, the measurement start signal forming means 6 sends measurement start signals simultaneously to the first optical distance measuring equipment 1 and the second optical distance measuring equipment 2. Herein, the expression "sends measurement start signals simultaneously" includes "sends completely physically simultaneously", but if the control signal can be sent in such a manner that the first and second optical distance measuring equipments 1 and 2 can carry out measurement simultaneously, that is sufficient. The first and second optical distance measuring equipments 1 and 2 measure the distances to the corresponding corner cubes and send them to the arithmetic section 5. In S3, the arithmetic section 5 causes the measured results of the first and second optical distance measuring equipments 1 and 2 to be memorized in the memory means 7. At that time, it is desirable that the time, etc. are also memorized. In S4, the arithmetic section 5 calculates the difference between the data of the first optical distance measuring equipment 1 and the data of the second optical distance measuring equipment 2. Assuming the first calculated data as the initial value, the difference (variation) between the second calculated data computed successively, and the initial value is also calculated. This calculation corresponds to the performance of the formula (6) of the first example or the formula (7) of the second example, and in the first example, the movement of the fault can be doubled. Then, in S5, the arithmetic section 5 judges whether the calculated variation is greater than the specified value or not. If the variation is greater than the specified value, since occurrence of an earthquake can be predicted, the arithmetic section 5 drives the alarm 9 to raise a warning. If the variation is not more than the specified value, S7 is carried out, and in S7 the arithmetic section 5 judges whether the measurement is to be continued or not. If the measurement is to be continued, S1, is carried out again, and the steps are repeated. If the measurement is to be stopped, S8 is carried out, and the arithmetic section 5 judges whether the memorized data is to be issued or not. If the memorized data is issued, the data memorized in the memory means 7 in S4 are outputted to an external memory means 40 such as a data collector or a data recorder. The data can be transferred to a host computer connected by a telephone circuit through the interface 20. If the memorized data is not outputted in S8, the observation is completed in S10.

This example arranged as described above can carry out observation continuously without any attendant to predict occurrence of an earthquake, landslide, or the like in its early stages and has an effect to allow a warning to be given by the alarm. Since the observation apparatuses of this example can be positioned at several observation points, and the calculated data can be transferred to a host computer through, for example, telephone circuits, so that there are effects that highly accurate observation of diastrophism can be performed, and for example prediction of earthquake can be effected with high reliability.

The present invention can be applied not only to observation of diastrophism but also to measurement of displacement of a structure such as a dam or a gas tank.

The present invention constituted as described above, in a first step, arranges a first reflective member and a second reflective member at a first point and a second point on the opposite sides of and adjacent to the plane where separation of objects will occur. Then, in a second step, a first optical distance measuring equipment is placed at a third point on the first object where the first optical distance measuring equipment can sight the second reflective member, and a second optical distance measuring equipment is placed at a fourth point on the second object where the second optical distance measuring equipment can sight the first reflective member. In a third step, the first optical distance measuring equipment measures the first distance between the second point and the third point, and the second optical distance measuring equipment measures the second distance between the first point and the fourth point. In a fourth step, the difference between the first distance and the second distance is calculated to find the separation of the first object and the second object. Further, in a second step, the present invention arranges a first optical distance measuring equipment at a third point on the second object where the first optical distance measuring equipment can sight a first reflective member, and a second optical distance measuring equipment is positioned at a fourth point on the second object where the second optical distance measuring equipment can sight the second reflective member. In a third step, the first optical distance measuring equipment measures the first distance between the first point and the third point, and at the same time the second optical distance measuring equipment measures the second distance between the second point and the fourth point. In this manner, the separation of the first object and the second object can also be calculated.

Further, in the present invention, a first optical distance measuring equipment positioned at a third point on a first object where the first optical distance measuring equipment can sight a second reflective member measures the first distance between a second point and the third point based on the control signal of a measurement start signal forming means, and a second optical distance measuring equipment positioned at a fourth point on a second object where the second optical distance measuring equipment can sight a first reflective member measures the second distance between the first point and the fourth point based on said control signal simultaneously with the first distance. An arithmetic section can also calculate the difference between the first distance and the second distance to find the separation of the first object and the second object. Further, in the present invention, a first optical distance measuring equipment positioned at a third point on a second object where the first optical distance measuring equipment can sight a first reflective member measures the first distance between a first point and the third point based on a control signal of a distance start signal forming means, and a second optical distance measuring equipment positioned at a fourth point on a second object where the second optical distance measuring equipment can sight a second reflective member measures the second distance between the second point and the fourth point simultaneously with the first distance. An arithmetic section can also calculate the distance between the first distance and the second distance to find the separation of the first object and the second object.

Thus, in the measuring method of the present invention constituted as described above, since two optical distance measuring equipments are arranged near the separation plane to measure the first distance and the second distance simultaneously, and the difference between the first distance and the second distance is calculated to find the separation between a first object and a second object, the present invention has such an effect that the measurement of the separation by simultaneous observations can be carried out. That is, the prior measuring method carries out absolute measurements of distances under different meteorological conditions to find the separation from the difference of the measurements whereas since the present invention can find the separation by simultaneous measurements, the present invention has such an effect that the present method is not influenced by meteorological conditions such as atmospheric pressure, temperature, etc.

Further, the present measuring apparatus is equipped with a measurement start signal forming means and an arithmetic section, and can operate two optical distance measuring equipments simultaneously, and since the difference between the measured values of the optical distance measuring equipments can be calculated at a high speed, the present measuring apparatus has an excellent effect that measurement of the separation can be carried out with quite high accuracy.

What is claimed is:

1. A method for measuring relative displacement of first and second objects along a common plane separating the objects comprising the steps of:

placing a first reflective member on said first object at a first point located near said separation plane, placing a second reflective member on said second object at a second point located near said separation plane and opposite said first point, placing first optical distance measuring equipment on said first object at a third point located near said separation plane and a predetermined distance along said separation plane from said first point where it can sight said second reflective member, placing second optical distance measuring equipment on said second object at a fourth point located near said separation plane opposite said third point where it can sight said first reflective member, using said first and second optical distance measuring equipment to simultaneously optically measure first and second distances between said first and fourth points and between said second and third points, respectively, and calculating the difference between said measured first and second distances to obtain a measure of the relative displacement, if any, of said first and second objects along said separation plane.

2. A method for measuring relative displacement of first and second objects along a common plane separating the objects comprising the steps of:

placing a first reflective member on said first object at a first point located near said separation plane, placing a second reflective member on said second object at a second point located near said separation plane and opposite said first point, placing first optical distance measuring equipment on said second object at a third point located near said separation plane and a predetermined distance along said separation plane from said second point where it can sight said first reflective member, placing second optical distance measuring equipment on said second object at a fourth point located said predetermined distance from said first point and further from said separation plane than said third point where it can sight said second reflective member, using said first and second optical distance measuring equipment to simultaneously optically measure first and second distances between said first and third points and between said second and fourth points, respectively, and calculating the difference between said measured first and second distances to obtain a measure of the relative displacement, if any, of said first and second objects along said separation plane.

3. Apparatus for measuring the relative displacement of first and second objects along a common plane separating the objects comprising, in combination:

first and second reflective members respectively placed on said first and second objects at first and second points located opposite each other near said separation plane, first optical distance measuring equipment positioned on said first object at a third point located near said separation plane at a predetermined distance from said second point in a direction along said separation plane for optically measuring a first distance between said first optical distance measuring equipment and said second reflective member, second optical distance measuring equipment positioned on said second object at a fourth point located said predetermined distance from said first point in a direction along said separation plane for optically measuring a second distance between said second optical distance measuring equipment and said first reflective member, control means including means for simultaneously applying start signals to said first and second optical distance measuring equipments for causing said equipments to respectively measure said first and second distances simultaneously, and arithmetic means coupled to said first and second optical distance measuring equipments for calculating the difference between said measured first and second distances to obtain a measure of the relative displacement, if any, of said first and second objects along said separation plane.

4. A method for measuring relative displacement between first and second objects along a common plane separating the objects comprising the steps of:

simultaneously optically measuring a first distance between a first point on said first object located near said separation plane and a second point on said second object located near said separation plane at a predetermined distance along said separation plane from said first point, and a second distance between a third point on said second object located near said separation plane opposite said first point and a fourth point on one or the other of said first and second objects located said predetermined distance along said separation plane from said first and third points, and calculating the difference between said measured first and second distances to obtain a measure of the relative displacement, if any, of said first and second objects along said separation plane.

5. A method according to claim 4, wherein said fourth point is located on said first object near said separation plane and opposite said second point.

6. A method according to claim 4, wherein said fourth point is located on said second object at a point further from said separation plane than said second point.

7. Apparatus for measuring the relative displacement of first and second objects along a common plane separating the objects comprising, in combination:

first and second reflective members respectively placed on said first and second objects at first and second points located opposite each other near said separation plane, first optical distance measuring equipment positioned on said second object at a third point located near said separation plane at a predetermined distance from said first point in a direction along said separation plane for optically measuring a first distance between said first optical distance measuring equipment and said first reflective member, second optical distance measuring equipment positioned on said second object at a fourth point located said predetermined distance from said second point in a direction along said separation plane for optically measuring a second distance between said second optical distance measuring equipment and said second reflective member.

control means including means for simultaneously applying start signals to said first and second optical distance measuring equipments for causing said equipments to respectively measure said first and second distances simultaneously, and arithmetic means coupled to said first and second optical distance measuring equipments for calculating the difference between said measured first and second distances to obtain a measure of the relative displacement, if any, of said first and second objects along said separation plane.

* * * * *

UNITED STATES PATENT AND TRADEMARK OFFICE
CERTIFICATE OF CORRECTION

PATENT NO. : 5,112,130
DATED : May 12, 1992
INVENTOR(S) : Nobuo Isawa

It is certified that error appears in the above-identified patent and that said Letters Patent is hereby corrected as shown below:

<u>Column 2, line 14</u>, "$R_1) - A_1$" should read --$R_1) + A_1$--;

<u>Column 2, line 45</u>, "$S_0 - D_1$" should read --$S_0 + D_1$--;

<u>Column 2, line 55</u>, "active" should read --active fault--;

<u>Column 2, line 56</u>, "fault" should read --active fault--;

<u>Column 3, line 32</u>, "$L_0 - D_1 - D_2$" (1st occurrence) should read --$L_0 + D_1 + D_2$--;

<u>Column 3, line 33</u>, "$D_1 - D_2$" should read --$D_1 + D_2$--;

<u>Column 3, line 56</u>, "equipment" should read --equipment 1--;

<u>Column 3, line 66</u>, "$(P_2)$" should read --$(P_2)$.--;

<u>Column 4, line 2</u>, "$_1-D_2$" should read --$_1 + D_2$--.

Signed and Sealed this

Twenty-eighth Day of September, 1993

Attest:

BRUCE LEHMAN

*Attesting Officer*    *Commissioner of Patents and Trademarks*